No. 735,582. PATENTED AUG. 4, 1903.
J. W. POPE.
MEASURE.
APPLICATION FILED MAY 14, 1903.
NO MODEL.
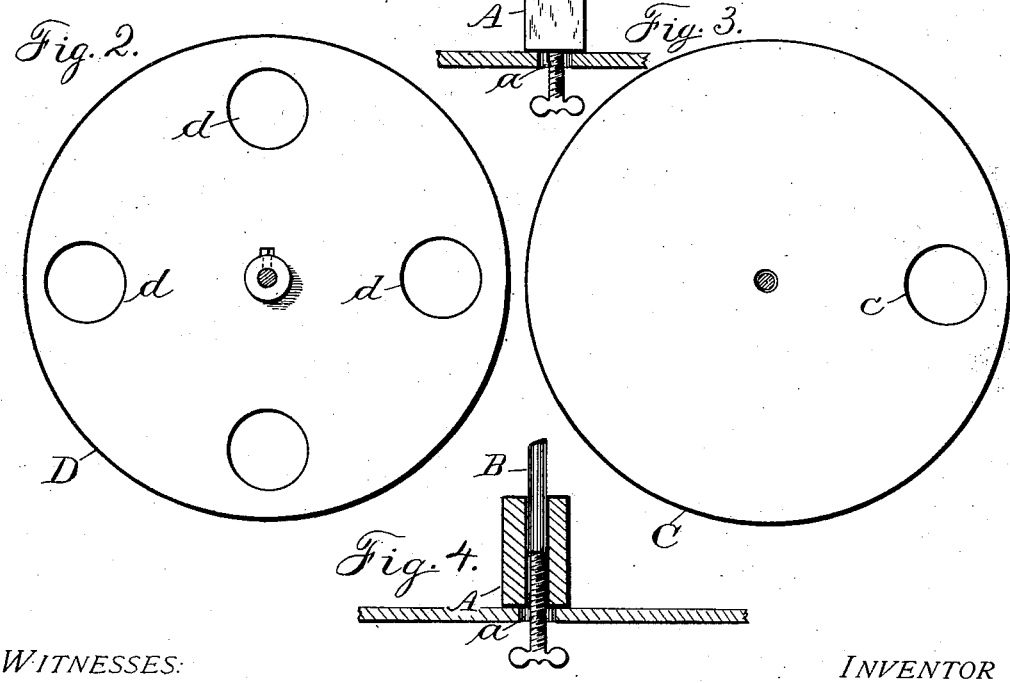
WITNESSES:
A. J. Thiele
C. P. Swett
INVENTOR
Joseph William Pope
BY
Attorney No. 735,582. Patented August 4, 1903.

UNITED STATES PATENT OFFICE.

JOSEPH WILLIAM POPE, OF EAST ST. LOUIS, ILLINOIS.

MEASURE.

SPECIFICATION forming part of Letters Patent No. 735,582, dated August 4, 1903.

Application filed May 14, 1903. Serial No. 157,124. (No model.)

*To all whom it may concern:*

Be it known that I, JOSEPH WILLIAM POPE, a citizen of the United States, residing at East St. Louis, in the county of St. Clair and State of Illinois, have invented new and useful Improvements in Measures, of which the following is a specification.

My invention is designed for measuring any dry, granulated, or powdered material, and is particularly well adapted for measuring rapidly and accurately commodities of which large numbers of packages containing a uniform quantity are to be done up, such as coffee and tea.

The accompanying drawings illustrate the invention, in which—

Figure 1 is a side elevation of the device, partly in section and partly broken away; Fig. 2, a plan of the upper disk; Fig. 3, a plan of the lower disk, and Fig. 4 a section of the adjusting mechanism.

The various parts of the device are referred to by letters, similar letters denoting corresponding parts in the several views.

The letter A indicates a socket or step supported in any convenient way, and $a$ is a vertical set-screw extending upward through its bottom. B is a vertical shaft seated in said step A and having its bearing on the point of the screw $a$ and by said screw is vertically adjustable.

C is a fixed horizontal plate or disk through which the shaft B passes centrally. This disk C has an opening or vent $c$ near its edge.

D is a disk corresponding in size to the disk C and is fixed on the shaft B above and parallel to the disk C and turns with said shaft. The disk D is provided with a plurality of openings $d$ $d$.

E E are tubes or measures of the same diameter as the holes $d$ and fixed to the under side of the disk D in line with the holes $d$.

The measures are each jointed at $e$ to permit of vertical adjustment, whereby the capacity of the measures is regulated. F is a fixed supply-tube adjustable at $f$ and connected with the hopper or chamber containing the stock to be measured off.

G is an outlet-tube fixed at the hole $c$ in the lower disk C. The disk D is rotated by any preferred means applied either to the disk D or to the shaft E.

In operation when the disk D is turned and a hole $d$, with its subjacent measure, comes beneath the supply-tube F the measure is instantly filled with the commodity, and as the filled measure is further turned from beneath tube F the flow is stopped by the interposition of the part of the disk between the openings $d$ $d$ until another measure comes into position for filling. When a filled measure, as the disk is rotated, comes above the chute G, the commodity is emptied therein to run into the bag, can, or other receptacle prepared for it.

Having now described my invention and the manner of using it, what I claim, and desire to secure, is—

1. A measuring device comprising a fixed lower disk having a vent therein, a rotatable disk above said fixed disk having inlet-holes therein, vertical measures between said disks, attached to said upper disk and in line with said inlet-holes, each being movable into alinement with said vent, a fixed supply-tube alinable with each one of said inlet-holes singly when said hole does not aline with said vent a vertical shaft loosely passing through said fixed disk and centrally attached to said rotatable disk, a step to support said shaft and a vertical adjusting-screw in said step as herein described.

2. In a measuring device, the combination with a horizontal, fixed disk having an outlet-aperture, a rotatable disk above said fixed disk having inlet-apertures and measures subjacent thereto, of a vertical shaft loosely passing through said fixed disk and centrally fixed to said rotatable disk, a step to support said shaft, and a vertical adjusting-screw in said step substantially as herein set forth.

In testimony whereof I have signed my name to this specification in the presence of two subscribing witnesses.

JOSEPH WILLIAM POPE.

Witnesses:
W. E. HAZEN,
R. DEMPSTER.